United States Patent [19]

Nagai et al.

[11] Patent Number: 5,693,394
[45] Date of Patent: Dec. 2, 1997

[54] PRESSURE-ACTIVATED FLUORESCENT MARKING TAPE

[75] Inventors: Yoshitsune Nagai, Osaka; Takehiko Nishibuchi, Hirakata, both of Japan

[73] Assignee: Union Chemicar Co., Ltd., Osaka, Japan

[21] Appl. No.: 617,198

[22] Filed: Mar. 18, 1996

[30] Foreign Application Priority Data

Mar. 20, 1995 [JP] Japan ................................ 7-087504

[51] Int. Cl.$^6$ .................................. C09J 7/02; C09D 11/00
[52] U.S. Cl. ..................... 428/42.1; 428/690; 428/41.7; 428/41.8; 428/343; 428/202; 428/203
[58] Field of Search ................................. 428/214, 42.1, 428/690, 41.7, 261, 41.8, 343, 202, 203

[56] References Cited

U.S. PATENT DOCUMENTS 5,242,725   9/1993   Weissman et al. ................... 428/41.5

*Primary Examiner*—Charles Nold
*Attorney, Agent, or Firm*—Dennison, Meserole, Pollack & Scheiner

[57] ABSTRACT

An adhesive fluorescent coloring layer is applied to a carrier, so that a pressure-activated fluorescent marking tape is formed. When pressure is applied to the back of the carrier, the adhesive fluorescent coloring agent layer is transferred to a substrate. A surface of the adhesive fluorescent coloring layer has a quality so that the adhesive fluorescent coloring layer can be removed from the substrate when applied with external force.

8 Claims, No Drawings

PRESSURE-ACTIVATED FLUORESCENT MARKING TAPE

BACKGROUND OF THE INVENTION

The present invention relates to a pressure-activated fluorescent marking tape having a fluorescent coloring layer formed on a strip carrier, and more particularly to a tape wherein the fluorescent coloring layer is transferred to a substrate such as a sheet of paper.

In order to highlight or to call attention to a particular passage of a printed or written text, there has been used a method of coloring the passage particularly with a fluorescent coloring agent.

More particularly, there has been used a writing instrument which is commonly called a fluorescent line marker, wherein applying ink including a fluorescent pigment as a base material is filled. The ink is directly applied to the substrate.

Another means is a method using a marking tape wherein the fluorescent coloring agent is coated on a strip of plastic carrier to form a coloring agent layer. Alternatively, a fluorescent coloring agent is kneaded into a plastic resin and formed into a strip. A pressure-activated adhesive layer is provided on one of the surfaces of the strip so as to be formed into a tape.

In the case of the line marker, when directly applied on the printed material, the color tone of the ink is often uneven, or the drawn line becomes scratchy. On some kinds of paper, the ink blurs, or seeps through the paper, and the color may lose its brightness. In addition, the width of the line drawn on the substrate is not always constant. Moreover, most of the applying ink is water-soluble, so that they cannot be applied on plastic, metal and other non-absorptive materials. Another drawback is that the ink cannot be erased or removed from the applied sheet when the marking is no longer necessary.

On the other hand, in some types of the adhesive marking tape, the carrier can be removed from the coloring agent layer adhered on the sheet. However, the colored strip of the tape must be sufficiently thick in order that the tape is easily unreeled from a spool, cut and transferred to the sheet, and that the overall handling efficiency of the tape is ensured. Hence, if the strips are applied to various portions of the sheet the thickness of the sheet itself is increased.

SUMMARY OF THE INVENTION

An object of the present invention is to provide a pressure-activated fluorescent marking tape wherein a marking line drawn on a substrate has a small thickness and constant width, does not blur or seep through the substrate, the color thereof is even in tone and superior in brightness, easy to handle, usable even on a non-absorptive material, and moreover, can be later removed from the substrate.

According to the present invention, there is provided a pressure-activated fluorescent marking tape having a carrier, and an adhesive fluorescent coloring layer coated on the carrier, wherein upon application of pressure on the back of the carrier, the adhesive fluorescent coloring layer is transferred to a substrate, characterized in that a surface of the adhesive fluorescent coloring layer has a quality so that the adhesive fluorescent coloring layer can be removed from the substrate when applied with external force owing to any or combinations of external friction force, absorption force, and adhesion force.

The adhesive strength of the coloring layer is 5 to 250 g/25 mm at a 180 degree peel test, and the coefficient of static friction of the surface of the coloring layer adhered on the substrate is 0.2 to 8.

The adhesive fluorescent coloring layer comprises a fluorescent coloring agent layer and an adhesive layer provided on the fluorescent coloring agent layer.

The thickness of the fluorescent coloring agent layer is about 5 to 20 µm, and preferably 10 to 15 µm.

The thickness of the adhesive layer is about 0.1 to 5 µm, and preferably 0.5 to 3 µm.

The pressure-activated fluorescent marking tape of the present invention basically has a layered construction comprising a fluorescent coloring agent layer adhered on a carrier, and an adhesive layer provided on the coloring agent layer to be adhered on a substrate. When applied with pressure from the back of the carrier, the coloring agent layer and the adhesive layer are transferred to the substrate. The thickness of the coloring agent layer is about 5 to 20 µm, and preferably 10 to 15 µm. The thickness of the adhesive layer is about 0.1 to 5 µm, and preferably 0.5 to 3 µm.

The material for the carrier is a plastic film such as a polyester film and acetate film of about 10 to 50 µm thickness. Release process is performed on one or both of the surfaces of the carrier by applying a releasing agent such as silicon resin to the surface so as to allow the coloring agent layer to be released from the carrier. The material may be thin paper such as glassine paper having a weight of about 30 to 60 g/m², the both surfaces thereof coated with the releasing agent.

The basic composition of the fluorescent coloring agent layer comprises a synthetic resin and fluorescent pigment. A regulator for regulating the resinous film, surface-active agent may be added as required. Resins of urethane, acrylic, vinyl, olefin and rubber and also a mixture of one or more thereof may be used as the synthetic resin. Although a dyestuff may be used as the fluorescent coloring agent, the pigment is preferable if the color fastness to light and weather resistance are considered.

The basic composition of the adhesive layer may be any synthetic resin having adhesive property such as acrylic, rubber, and vinyl ether resins. An adhesion regulator and an antioxidant may further be added as required.

In accordance with the present invention, the coloring agent layer adhered on the substrate can be removed by applying external force owing to the quality of the surface thereof, such as friction force, adsorption force and adhesion force, or combinations thereof.

For example, if the surface of the coloring agent layer adhered on the substrate is rubbed with a finger tip, applying a proper force thereto, the layer can be removed from the substrate together with the adhesive layer.

In order to allow the removal of the fluorescent coloring agent layer from the substrate, the adhesive strength of the adhesive layer to the substrate is 5 to 250 g/25 mm and preferably 30 to 80 g/25 mm. The adhesive strength mentioned in the present specification is an SP adhesive strength detected at a 180 degree peel test conducted under the Japanese Industrial Standard Z 0237, wherein the adhesive is adhered on a polished stainless plate and peeled off after a predetermined time.

If the adhesive strength is smaller than 5 g/25 mm, the coloring agent layer may not be sufficiently applied to the substrate depending on the material and the surface physical properties thereof. If the adhesive strength is larger than 250 g/25 mm, the coloring agent layer cannot be later removed from the substrate, or when stored on a spool for a long time, a blocking occurs, which is an undesired adhesion between the adjacent layers.

The coefficient of static friction of the surface of the coloring agent layer is 0.2 to 8, and preferably 1 to 5.

When the coefficient of static friction is smaller than 0.2, the coloring agent layer cannot be removed from the substrate, because of insufficient friction force. Namely, the surface of the coloring agent layer is slippery, that is, the surface tension thereof is small, so that friction force cannot overcome adhesive force of the adhesive layer applied on the substrate. When the coefficient of static friction is larger than 8, the tackiness is so increased that the surface becomes excessively sticky and also causes the hereinbefore described blocking.

The pressure-activated marking tape of the present invention having an extremely thin adhesive fluorescent coloring agent layer which is uniformly formed on the strip carrier is highly advantageous in practical use in that the coloring agent layer adhered to the substrate of any material including an absorptive material forms a marking line which has a constant width, does not become scratchy, blurred or seep through, the color thereof even, and maintaining its brightness. The adhered layer is so thin that the thickness of the substrate is not affected. The coloring agent layer can even be removed.

These and other objects and features of the present invention will become more apparent from the following detailed description.

DETAILED DESCRIPTION OF THE EMBODIMENTS

EXAMPLE 1

| Liquid 1-A | |
| --- | --- |
| Single fluid urethane resin | 12 parts by weight |
| Vinyl chloride/vinyl acetate copolymer | 3 parts by weight |
| Fluorescent oil-soluble dyestuff (lemon yellow) | 3.5 parts by weight |
| Silicone dioxide (SiO$_2$) | 6 parts by weight |
| Alkylphenolic nonionic surface-active agent | 0.5 part by weight |
| Toluene | 50 parts by weight |
| Ethyl acetate | 25 parts by weight |
| Liquid 1-B | |
| Vinyl ether resin | 20 parts by weight |
| Terpene phenolic resin | 5 parts by weight |
| Aluminosilicate | 8 parts by weight |
| High-molecular carboxylic anionic surface-active agent | 2 parts by weight |
| Hindered phenolic antioxidant | 1 part by weight |
| Methyl cyclohexane | 64 parts by weight |

The silicon dioxide and aluminosilicate in liquid 1-A and 1-B, respectively, are extenders.

The liquid 1-A was coated on one side of a polyester film of 25 μm, as a fluorescent coloring agent layer, the both sides of the polyester film had been coated with the releasing agent, thereby to form a 10 μm layer in a dry condition. The liquid 1-B was then coated on the coloring agent layer as an adhesive layer to form a 2 μm layer in the dry condition. The film was cut into a strip having a width of 6 mm and set in a tape applicator having an automatic reeling mechanism comprising a supply spool, take-up spool and a pressure member for applying the layers to a substrate. When the tape applicator was drawn on the substrate, a fluorescent coloring agent layer of very bright lemon yellow was formed in a line of a constant width. When the surface of the fluorescent coloring agent layer was lightly rubbed with a finger tip, the layer was easily removed from the substrate.

The SP adhesive strength detected in accordance with the 180 degree peel test was 35.4 g/25 mm, and the coefficient of static friction was 1.23.

The coefficient of static friction was small enough so that the finger tip, without slipping on the coloring agent layer, caused the frictional force and frictional temperature to be generated. Hence, together with the smallness of the SP adhesive strength, the coloring agent layer could be easily removed from the substrate.

EXAMPLE 2

| Liquid 2-A | |
| --- | --- |
| Polystyrene/polybutadiene block copolymer | 15 parts by weight |
| Polystyrene/polyisoprene block copolymer | 7 parts by weight |
| Hydrocarbon resin | 1 part by weight |
| Fluorescent pigment (pink) | 6 parts by weight |
| Alkylphenolic nonionic surface-active agent | 1 part by weight |
| Ethyl cyclohexane | 50 parts by weight |
| Toluene | 20 parts by weight |
| Liquid 2-B | |
| Acrylic emulsion resin (25% aqueous solution) | 32 parts by weight |
| Aluminosilicate | 3 parts by weight |
| Methanol | 10 parts by weight |
| Water | 55 parts by weight |

The hydrocarbon resin in the liquid 2-A is a resin reforming agent.

The liquid 2-A was coated on one side of a sheet of glassine paper, the weight of which is 40 g/m$^2$, thereby to form a 12 μm coloring agent layer. The liquid 2-B was then coated to form a 1.5 μm adhesive layer. The sheet was cut and set in the automatic tape applicator as in the EXAMPLE 1 described above. When the tape applicator was drawn on a substrate, a very bright fluorescent pink layer was formed in a line of a constant width. When the surface of the fluorescent coloring agent layer was lightly rubbed with a commercial rubber eraser, the layer was easily removed from the substrate.

The SP adhesive strength detected in accordance with the coloring agent layer degree peel test was 50.0 g/25 mm, and the coefficient of static friction was 3.73.

COMPARATIVE EXAMPLE

| Liquid C | |
| --- | --- |
| Unsaturated polyester resin | 15 parts by weight |
| Fluorescent oil-soluble dyestuff (pink) | 3 parts by weight |
| Silicone dioxide (SiO$_2$) | 6 parts by weight |
| Alkylphenolic nonionic surface-active agent | 1 part by weight |
| Toluene | 40 parts by weight |
| Ethyl methyl ketone | 35 parts by weight |
| Liquid D | |
| Single fluid acrylic resin | 25 parts by weight |
| Aluminosilicate | 2.5 parts by weight |

| -continued | |
|---|---|
| High-molecular carboxylic anionic surface-active agent | 0.5 part by weight |
| Ethyl cyclohexane | 62 parts by weight |
| Toluene | 10 parts by weight |

The silicon dioxide and aluminosilicate in liquids C and D, respectively, are extenders.

The liquid C was coated on a sheet of glassine paper having a weight of 40 g/m$^2$ the both sides thereof had been coated with releasing agent, thereby to form a 10 μm layer in the dry condition. The liquid D was then coated to form a 2 μm layer in the dry condition. The sheet was cut and set in the automatic tape applicator as in the EXAMPLE 1 described above. When the tape applicator was drawn on a substrate, a bright fluorescent pink layer was formed in a line of a constant width. The surface of the fluorescent coloring agent layer was thereafter rubbed with a finger tip, and with a commercial rubber eraser, scraped after covering the layer with a weak adhesive sheet. Despite the effort, the coloring agent layer could not be removed. In addition, the blocking had occurred adjacent the heart of the spool.

The SP adhesive strength detected in accordance with the 180 degree peel test was 312 g/25 mm, and the coefficient of static friction was 0.17.

From the foregoing it will be understood that the present invention provides an excellent pressure-activated fluorescent marking tape wherein a resultant marking line formed on a substrate has a constant width, is not scratchy, blurred or seep through the substrate, and the color thereof is even in tone, and maintains its brightness. The tape can be further used on a non-absorptive material and moreover, can be later removed from the substrate.

While the invention has been described in conjunction with preferred specific embodiment thereof, it will be understood that this description is intended to illustrate and not limit the scope of the invention, which is defined by the following claims.

What is claimed is:

1. A pressure activated fluorescent marking tape, comprising a carrier, a fluorescent coloring layer coated onto a surface of the carrier and an a non-colored adhesive synthetic resin layer coated onto a surface of the fluorescent coloring layer opposite the carrier, said fluorescent coloring layer being transferrable from the carrier to a substrate by application of the adhesive layer to the substrate with pressure applied to the carrier layer, and said fluorescent coloring layer being removable from the substrate by external force as a result of external friction force, absorption force, adhesion force or a combination thereof.

2. The marking tape according to claim 1 wherein SP adhesive strength of the coloring layer to a substrate is 5 to 250 g/25 mm at a 180 degree peel test.

3. The marking tape according to claim 1 wherein coefficient of static friction between the coloring layer and a substrate is 0.2 to 8.

4. The marking tape according to claim 3 wherein coefficient of static friction of the surface is 1 to 5.

5. The marking tape according to claim 1 wherein thickness of the fluorescent coloring agent layer is about 5 to 20 μm.

6. The marking tape according to claim 1 wherein thickness of the adhesive layer is about 0.1 to 5 μm.

7. The marking tape according to claim 1 wherein thickness of the fluorescent coloring agent layer is about 10 to 15 μm.

8. The marking tape according to claim 1 wherein thickness of the adhesive layer is about 0.5 to 3 μm.

* * * * *